United States Patent
Wang et al.

(10) Patent No.: US 10,031,589 B2
(45) Date of Patent: Jul. 24, 2018

(54) APPARATUSES, METHODS AND COMPUTER PROGRAMS FOR REMOTE CONTROL

(71) Applicant: Nokia Technologies Oy, Espoo (FI)

(72) Inventors: Kongqiao Wang, Beijing (CN); Yingfei Liu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/892,838

(22) PCT Filed: May 22, 2013

(86) PCT No.: PCT/CN2013/076062
§ 371 (c)(1),
(2) Date: Nov. 20, 2015

(87) PCT Pub. No.: WO2014/186955
PCT Pub. Date: Nov. 27, 2014

(65) Prior Publication Data
US 2016/0154476 A1  Jun. 2, 2016

(51) Int. Cl.
*G09G 5/00* (2006.01)
*G06F 3/0346* (2013.01)
*G06F 3/0484* (2013.01)
*G06F 3/14* (2006.01)

(52) U.S. Cl.
CPC ........ *G06F 3/0346* (2013.01); *G06F 3/04845* (2013.01); *G06F 3/1454* (2013.01); *G06F 2203/04806* (2013.01)

(58) Field of Classification Search
CPC .. G06F 3/0346; G06F 3/1454; G06F 3/04845; G06F 2203/04806; G06F 2203/0383; G09G 2340/045; G09G 2370/06; G09G 2370/16; G09G 2370/20;
(Continued)

(56) References Cited

U.S. PATENT DOCUMENTS

| | | | |
|---|---|---|---|
| 2010/0056273 | A1 | 3/2010 | Reville et al. |
| 2011/0022965 | A1 | 1/2011 | Lawrence et al. |
| 2011/0294433 | A1 | 12/2011 | Matsubara et al. |

(Continued)

FOREIGN PATENT DOCUMENTS

| | | |
|---|---|---|
| CN | 101523886 | 9/2009 |
| CN | 101939989 | 1/2011 |

(Continued)

OTHER PUBLICATIONS

International Search Report and Written Opinion received for corresponding Patent Cooperation Treaty Application No. PCT/CN2013/076062, dated Feb. 27, 2014, 13 pages.

(Continued)

*Primary Examiner* — Adam R Giesy
(74) *Attorney, Agent, or Firm* — Harrington & Smith

(57) ABSTRACT

A method comprising: causing transfer of a displayable first item to a display of a remote apparatus by causing transfer of data to the remote apparatus, the data defining features of the displayable first item; and enabling remote user-control of interaction, in the display of the remote apparatus, between a second item displayed in the display of the remote apparatus and the transferred displayable first item.

16 Claims, 14 Drawing Sheets

(58) Field of Classification Search
CPC ........ G09G 2356/00; G09G 5/12; G09G 5/14; G09G 2360/06
See application file for complete search history.

(56) References Cited

U.S. PATENT DOCUMENTS

| | | |
|---|---|---|
| 2012/0188147 A1 | 7/2012 | Hosein et al. |
| 2013/0027404 A1* | 1/2013 | Sarnoff .................... G06T 1/20 345/441 |

FOREIGN PATENT DOCUMENTS

| | | |
|---|---|---|
| CN | 102496356 A | 6/2012 |
| EP | 1307062 A1 | 5/2003 |
| WO | 2001/080180 A2 | 10/2001 |
| WO | 2006043977 | 4/2006 |

OTHER PUBLICATIONS

"WebOS Touch to Share URLs, Calls, and More Between Pre3 and TouchPad", Slashgear, Retrieved on Feb. 28, 2017, Webpage available at : https://www.slashgear.com/webos-touch-to-share-urls-calls-and-more-between-pre3-and-touchpad-09132164/.

"This Is the Year of the Virtual Fit Assistant", Techli, Retrieved on Feb. 28, 2017, Webpage available at : http://techli.com/2011/11/year-of-virtual-fit-assistant/#.

Greenberg et al., "Proxemic interactions: the new ubicomp", Magazine Interactions, vol. 18, No. 1, Jan.-Feb. 2011, pp. 42-50.

"Proxemic Interaction", Grouplab, Retrieved on Feb. 28, 2017, Webpage available at : http://grouplab.cpsc.ucalgary.ca/Projects/ProjectProxemicInteraction.

Bergman et al., "Hands on Music: Physical Approach to Interaction With Digital Music", Proceedings of the 11th International Conference on Human-Computer Interaction with Mobile Devices and Services, Sep. 15-18, 2009, 11 pages.

"Multi-User Handheld Projector Demo", Youtube, Retrieved on Feb. 28, 2017, Webpage available at : https://www.youtube.com/watch?v=qOen1yGM2bY.

Cao et al., "Multi-User Interaction Using Handheld Projectors", Proceedings of the 20th annual ACM symposium on User interface software and technology, Oct. 7-10, 2007, pp. 43-52.

"MagicPhone: Pointing & Interacting", Youtube, Retrieved on Feb. 28, 2017, Webpage available at : https://www.youtube.com/watch?v=6aVnSmY81KA&feature=youtu.be.

Myers et al., "Interacting At a Distance: Measuring the Performance of Laser Pointers and Other Devices", Proceedings of the SIGCHI Conference on Human Factors in Computing Systems, vol. 4, No. 1, Apr. 20-25, 2002, pp. 33-40.

Terrenghi et al., "A Taxonomy for and Analysis of Multi-Person-Display Ecosystems", Personal and Ubiquitous Computing, vol. 13, No. 8, Nov. 2009, pp. 583-598.

Sanchez, "Cross-Display Object Movement in Multi-Display Environments", Thesis, Dec. 2009, 225 pages.

Extended European Search Report received for corresponding European Patent Application No. 13885452.6, dated Jan. 30, 2017, 11 pages.

"DualShock", Wikipedia, Retrieved on Feb. 28, 2017, Webpage available at : https://en.wikipedia.org/wiki/DualShock.

"Airplay", Wikipedia, Retrieved on Feb. 1, 2017, Webpage available at :https://en.wikipedia.org/wiki/AirPlay.

* cited by examiner

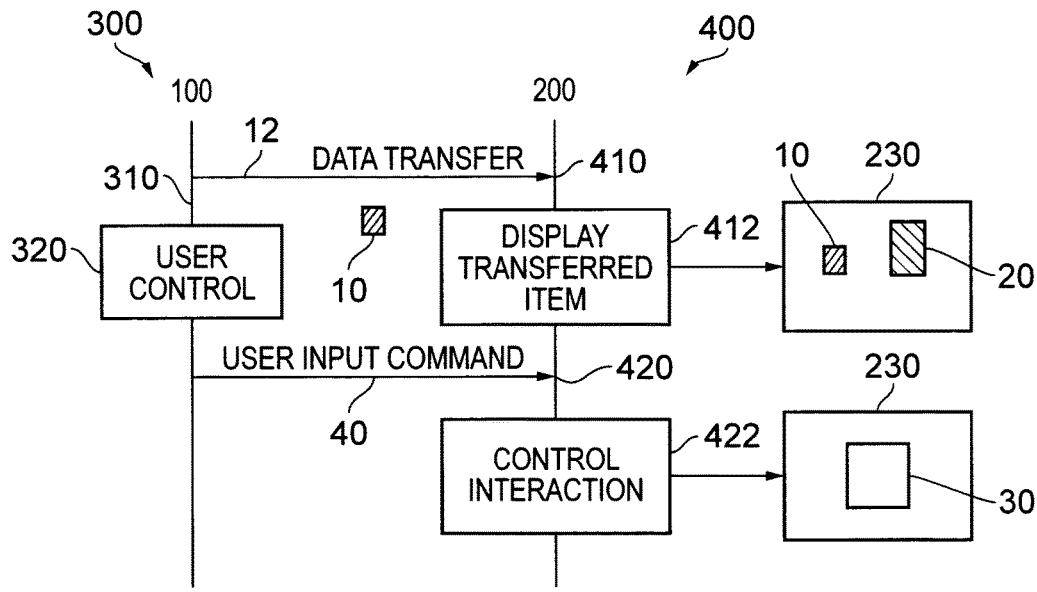
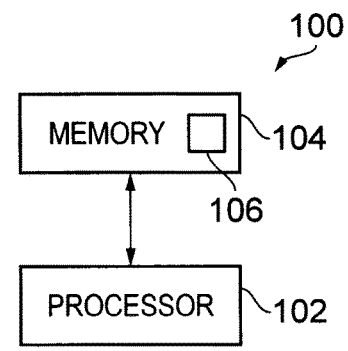
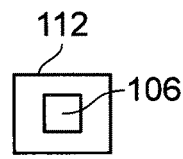
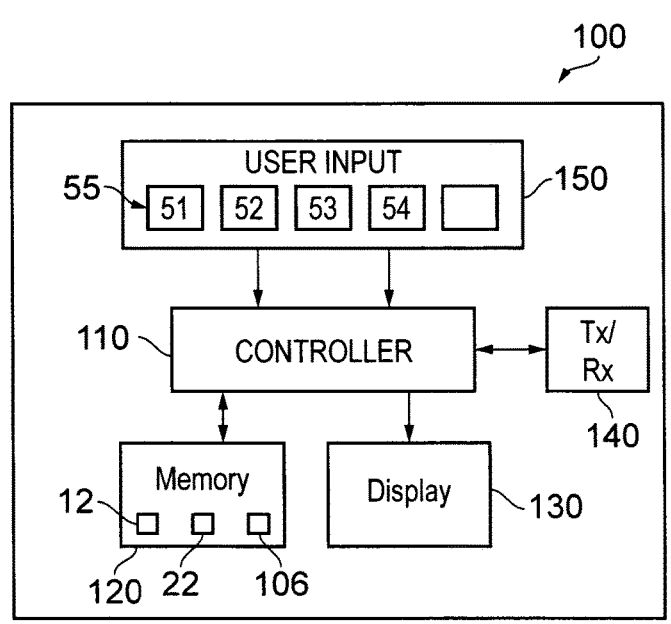
FIG. 1
FIG. 2A
FIG. 2B
FIG. 3

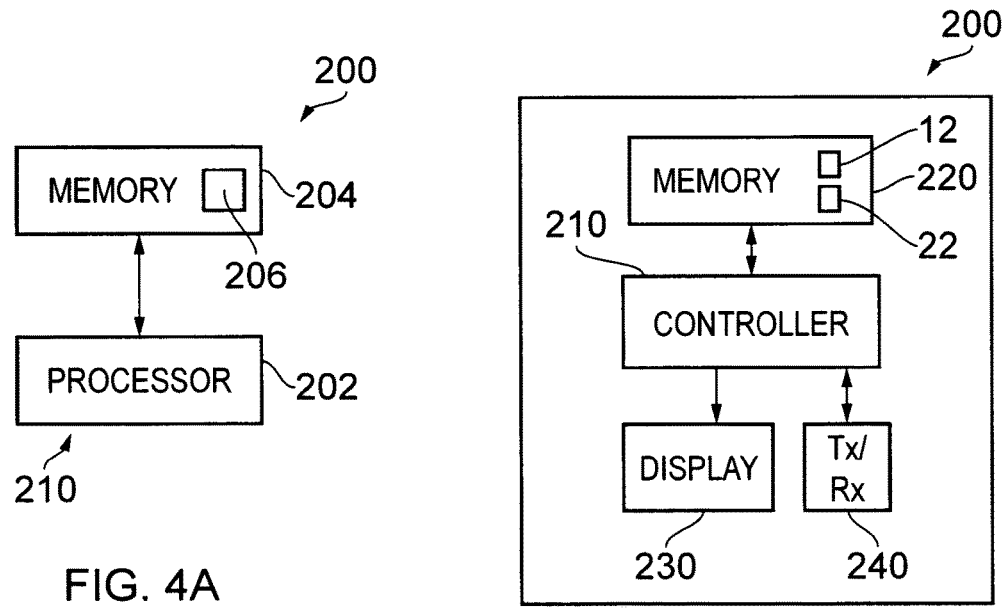
FIG. 4A
FIG. 5
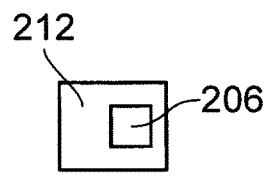
FIG. 4B
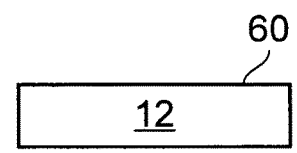
FIG. 6

APPARATUSES, METHODS AND COMPUTER PROGRAMS FOR REMOTE CONTROL

RELATED APPLICATION

This application was originally filed as PCT Application No. PCT/CN2013/076062 filed May 22, 2013.

TECHNOLOGICAL FIELD

Embodiments of the present invention relate to apparatuses, methods and computer programs for remote control.

BACKGROUND

It is now common for members of the public to own sophisticated electronic apparatus. These apparatus may be portable and personal to the user such as a mobile cellular telephone, a personal media player etc.

These apparatus often have processing, storage, communication, sensing and user input functions so that the device can be used for its intended purpose. It would be desirable to use some or all of these functions to enable use of the apparatus for additional purposes.

BRIEF SUMMARY

According to various, but not necessarily all, embodiments of the invention there is provided an apparatus comprising: at least one processor; and at least one memory including computer program code the at least one memory and the computer program code configured to, with the at least one processor, cause the apparatus at least to perform: causing transfer of a displayable first item to a display of a remote apparatus by causing transfer of data to the remote apparatus, the data defining features of the displayable first item; and enabling remote user-control of interaction, in the display of the remote apparatus, between a second item displayed in the display of the remote apparatus and the transferred displayable first item.

According to various, but not necessarily all, embodiments of the invention there is provided a method comprising: causing transfer of a displayable first item to a display of a remote apparatus by causing transfer of data to the remote apparatus, the data defining features of the displayable first item; and enabling remote user-control of interaction, in the display of the remote apparatus, between a second item displayed in the display of the remote apparatus and the transferred displayable first item.

According to various, but not necessarily all, embodiments of the invention there is provided a computer program that, when run on a computer, performs: enabling transfer of a displayable first item to a display of a remote apparatus by enabling transfer of data to the remote apparatus, the data defining features of the displayable first item; and enabling remote user-control of interaction, in the display of the remote apparatus, between a second item displayed in the display of the remote apparatus and the transferred displayable first item.

According to various, but not necessarily all, embodiments of the invention there is provided an apparatus comprising: at least one processor; and at least one memory including computer program code the at least one memory and the computer program code configured to, with the at least one processor, cause the apparatus at least to perform: enabling transfer of a displayable first item to a display of the apparatus by enabling transfer of data from a remote user apparatus, the data defining features of the displayable first item; causing display of the displayable first item in the display using the data received from the remote user apparatus; causing display of a displayable second item in the display; and controlling interaction, in the display, between the displayable first item and the displayable second item in response to user input commands received from the remote user apparatus.

According to various, but not necessarily all, embodiments of the invention there is provided a method comprising: enabling transfer of a displayable first item to a display of an apparatus by receiving data from a remote user apparatus, the data defining features of the displayable first item; displaying a displayable second item in the display; displaying the displayable first item in the display; receiving user input commands from the remote user apparatus; and controlling interaction, in the display, between the displayable first item and the displayable second item in response to the received user input commands.

According to various, but not necessarily all, embodiments of the invention there is provided a computer program that, when run on a computer, performs: enabling transfer of a displayable first item to a display of an apparatus by receiving data from a remote user apparatus, the data defining features of the displayable first item; enabling display of the displayable first item in the display; controlling interaction, in the display, between the displayable first item and a displayable second item in response to the user input commands received from the remote user apparatus.

BRIEF DESCRIPTION

For a better understanding of various examples that are useful for understanding the brief description, reference will now be made by way of example only to the accompanying drawings in which:

FIG. 1 illustrates an example of a process in which a user apparatus and a display apparatus communicate to enable transfer of a displayable first item to the display apparatus;

FIG. 2A illustrates a controller for the user apparatus 100;

FIG. 2B illustrates an example of a signal or data structure configured to transport computer program code for the user apparatus;

FIG. 3 illustrates an example of a user apparatus;

FIG. 4A illustrates a controller for the display apparatus;

FIG. 4B illustrates an example of a signal or data structure configured to transport computer program code for the display apparatus;

FIG. 5 illustrates an example of a display apparatus;

FIG. 6 illustrates an example of a portable data structure that comprises the data defining features of the displayable first item;

INTRODUCTION TO DETAILED DESCRIPTION

Figure 7:
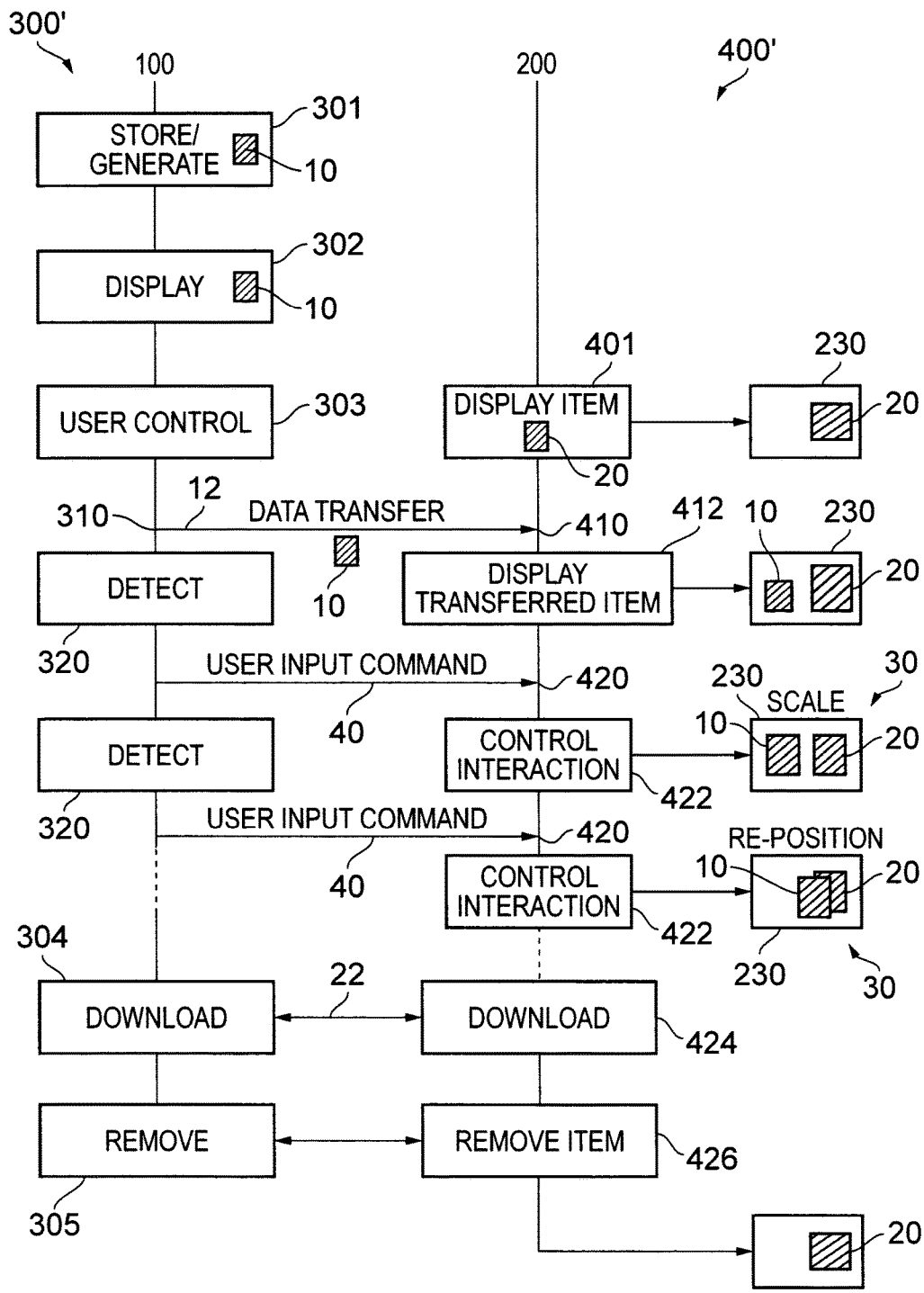
FIG. 7 illustrates another example of a process in which a user apparatus and a remote display apparatus communicate to enable transfer of a displayable first item to a remote display apparatus.

The Figures illustrate a method 300, performed at a user apparatus 100, comprising: causing transfer 310 of a displayable first item 10 to a display 230 of a remote display apparatus 200 by causing transfer 310 of data 12 to the remote display apparatus 200, the data 12 defining features of the displayable first item 10; and enabling remote user-control 320 of interaction 30, in the display 230 of the remote display apparatus 200, between a second item 20 displayed in the display 230 of the remote display apparatus 200 and the transferred displayable first item 10.

The user apparatus 100 comprising: means for performing the method 300. The means may comprise software only, hardware only or a combination of software and hardware.

As an example illustrated in FIG. 2, the user apparatus 100 may comprise: at least one processor 102; and at least one memory 104 including computer program code 106 the at least one memory 104 and the computer program code 106 configured to, with the at least one processor 102, cause the user apparatus 100 at least to perform the method 300. The computer program 106, when run on a computer, performs the method 300.

The Figures also illustrate a method 400, performed at a display apparatus 400 that is remote from the user apparatus 100, comprising:

enabling transfer of a displayable first item 10 to a display 230 of the display apparatus 200 by receiving 410 data 12 from the remote user apparatus 100, the data 12 defining features of the displayable first item 10;

displaying 412 a displayable second item 20 in the display 230;

displaying 412 the displayable first item 10 in the display 230;

receiving 420 user input commands 40 from the remote user apparatus 100; and controlling 422 interaction 30, in the display 230, between the displayable first item 10 and the displayable second item 20 in response to the received user input commands 40.

The display apparatus 200 comprising: means for performing the method 400. The means may comprise software only, hardware only or a combination of software and hardware.

As an example illustrated in FIG. 4, the display apparatus 200 may comprise: at least one processor 202; and at least one memory 204 including computer program code 206 the at least one memory 204 and the computer program code 206 configured to, with the at least one processor 202, cause the user apparatus 200 at least to perform the method 400.

The computer program 206, when run on a computer, performs the method 400.

DETAILED DESCRIPTION

FIG. 1 illustrates an example of a process in which a user apparatus 100 and a remote display apparatus 200 communicate to enable a user of the user apparatus 100 to transfer a displayable first item 10 to the display apparatus 200 and to control an interaction 30, in a display 230 of the display apparatus 200, between the displayable first item 10 and a displayable second item 20.

The display apparatus 200 is remote from the user apparatus 100 from the perspective of the user apparatus 100. The user apparatus 100 is remote from the display apparatus 200 from the perspective of the display apparatus 200.

The user apparatus 100 and the remote display apparatus 200 perform respectively methods 300, 400.

The method 300, performed at the user apparatus 100 comprises:

At the user apparatus 100, causing transfer 310 of a displayable first item 10 to a display 230 of a remote display apparatus 200 by causing transfer of data 12 to the remote display apparatus 200, the data 12 defining features of the displayable first item 10.

At the user apparatus 100, enabling remote user-control of interaction 30, in the display 230 of the remote display apparatus 200, between a second item 20 displayed in the display 230 of the remote display apparatus 200 and the transferred displayable first item 10.

The method 400, performed at the display apparatus 300 comprises:

At the display apparatus 300, enabling transfer of a displayable first item 10 to a display of the apparatus by receiving 410 data 12 from a remote user apparatus 100, the data 12 defining features of the displayable first item 10;

At the display apparatus 300, displaying 412 a displayable second item 20 in the display 230;

At the display apparatus 300, displaying 412 the displayable first item 10 in the display 230;

At the display apparatus 300, receiving 420 user input commands 40 from the remote user apparatus 100; and At the display apparatus 300, controlling 422 interaction 30, in the display 230, between the displayable first item 10 and the displayable second item 20 in response to the received user input commands 40.

The interaction of the methods 300, 400 occurs as flows;

First, the user apparatus 100, causes transfer 310 of a displayable first item 10 to a display 230 of a remote display apparatus 200 by causing transfer of data 12 to the remote display apparatus 200. The transferred data 12 defines features of the displayable first item 10.

At the same time, the display apparatus 300 enables transfer of the displayable first item 10 to the display 230 of the display apparatus 300 by receiving 410 the data 12 from a remote user apparatus 100.

Then the display apparatus 300 displays 412 a displayable second item 20 in a display 230 and the displayable first item 10 in the display 230.

Next, the user apparatus 100 enables remote user-control of interaction 30, in the display 230 of the remote display apparatus 200, between the second item 20 displayed in the display 230 of the remote display apparatus 200 and the transferred displayable first item 10. User input commands 40 are sent from the user apparatus 100 to the display apparatus 200.

The display apparatus 300, receives 420 the user input commands 40 from the remote user apparatus 100 and controls 422 interaction 30, in the display 230, between the displayable first item 10 and the displayable second item 20 in response to the received user input commands 40.

FIG. 7 illustrates an example of a process in which a remote user apparatus 100 and a remote display apparatus 200 communicate to enable a user of the user apparatus 100 to transfer a displayable first item 10 to the display apparatus 200 and to control, in real-time, an interaction 30, in a display 230 of the display apparatus 200, between the displayable first item 10 and a displayable second item 20. The user apparatus 100 and the display apparatus 200 perform respectively methods 300', 400'.

The method 300' is an example of an instance in a class of methods defined by the method 300 described in relation to FIG. 1. The method 300' has a plurality of features that are additional to the features of method 300. These additional features represent the difference between the method 300 and 300'. Any features including one of the additional features or any combination of some of all of the additional features of the method 300' may be independently added to the method 300 to create a new instance in the class of methods defined by the method 300 described in relation to FIG. 1. Reference to "the method 300'" refers to the method described with reference to FIG. 1 and reference to "the methods 300'" refers to all instances in the class of methods defined by the method 300 described in relation to FIG. 1 which includes, for example, the method 300 and the method 300'.

The method 400' is an example of an instance in a class of methods defined by the method 400 described in relation to FIG. 1. The method 400' has a plurality of features that are additional to the features of method 400. These additional features represent the difference between the method 400 and 400'. Any features including one of the additional features or any combination of some of all of the additional features of the method 400' may be independently added to the method 400 to create a new instance in the class of methods defined by the method 400 described in relation to FIG. 1. Reference to "the method 400'" refers to the method described with reference to FIG. 1 and reference to "the methods 400'" refers to all instances in the class of methods defined by the method 300 described in relation to Fig which includes, for example, the method 400 and the method 400'.

Before data 12 is transferred from the user apparatus 100 to the display apparatus 200, a number of preliminaries may be carried out.

At the display apparatus 200, the display apparatus 200 may display the second item 20 in the display 230 prior to enabling transfer of the displayable first item 10. This allows a user of the user apparatus 100 to view the second item displayed in display 230 before initiating transfer of the data 12. In this example, the second item 20 is pre-existing, in that it is present (and optionally displayed) at the display apparatus 200 before transfer of the first display item 10.

At the user apparatus 100, the first display item may be stored 301 in a memory. This may be achieved by storing the data 12, defining features of the displayable first item 10, in the memory. The data 12 may be stored in a portable data structure 60 that facilitates transfer of the data 12, as illustrated in FIG. 6.

In some examples, but not necessarily all examples, the data 12 may wholly define all of the features of the displayable first item 10.

The data 12, defining features of the displayable first item 10, may be personal data 12 that is personal to a user of the user apparatus 100. For example, it may be data that records personal attributes of the user of the user apparatus 100 such as age, weight, height, dimensions etc.

Alternatively, or in addition, the displayable first item 10 may be generated 301 at the user apparatus 100. This may be achieved by generating the data 12, defining features of the displayable first item 10. The data 12 may be generated under the control of the user of the user apparatus 100 and the user may be able to edit the displayable first item, for example, via a graphical user interface.

The displayable first item 10 may be a portable image, for example, a captured image of the user of the user apparatus 100.

The displayable first item 10 may be a graphical item. A graphical item conveys information visually rather than semantically (using a lexicon of words or symbols).

The displayable first item 10 may be a representation of a real-world object or a representation of the user of the user apparatus 100. The displayable first item 10 may be an image or a realistic graphical representation, for example, an avatar or three dimensional model of the user.

The user apparatus 100 may display 302 the displayable first item 10 at the user apparatus 100 before causing transfer of the displayable first item 10 to the display of the remote display apparatus 200. This allows a user to inspect the displayable first item 10 before transfer. In some examples, but not necessarily all examples, the user may be able to adapt the displayable first item 10 before transfer.

The user apparatus 100 may enable 303 the user to select the displayable first item 10 for transfer or otherwise control the initiation of the transfer process.

The transfer process involves communication with the remote display apparatus 200. In this example, but not necessarily all examples, a wireless communication link is used. The wireless link may be pre-existing or may be created for the purpose of the transfer.

The user apparatus 100, transfers 310 the displayable first item 10 to the display apparatus 200 by causing transfer of the data 12 to the remote display apparatus 200. The data 12 defines features of the displayable first item 10.

The display apparatus 300 simultaneously enables transfer of the displayable first item 10 to the display apparatus 300 by receiving 410 the data 12.

The display apparatus 200 then uses the data 12 to display 412 the displayable first item 10 in the display 230 along with the displayable second item 20.

The user of the user apparatus 100 is able to view the display 230 and control, in real-time, interaction 30 between the first item 10 and second item 20 while they are displayed in the display 230.

The user apparatus 100, enables remote, real-time user-control of interaction 30, in the display 230 of the remote display apparatus 200, between a second item 20 displayed in the display 230 of the remote display apparatus 200 and the transferred displayable first item 10. The user apparatus 100 detects 320 user input, and in response sends the user input commands 40 via the wireless communication link to the remote display apparatus 200.

The display apparatus 300, receives 420 user input commands 40 from the remote user apparatus 100 and, in response, automatically controls 422 interaction 30, in the display 230, between the displayable first item 10 and the displayable second item 20 in response to the received user input commands 40.

In some examples, but not necessarily all examples, the user apparatus 100 generates first user input commands in response to changes in a position of the user apparatus 100 and/or generates second user input commands in response to changes in orientation of the user apparatus 100.

In some examples, but not necessarily all examples, the display apparatus 200 detects user input commands recording changes in a position and/or orientation of the user apparatus 100 and, in response to the user input commands, controls interaction 30, in the display 230, between the displayed second item 20 and the transferred displayable first item 10. More detail is provided below with reference to FIGS. 8A to 8D.

The interaction 30, in the display 230 of the remote display apparatus 200, between the second item 20 displayed in the display 230 and the transferred displayable first item 10 may be any suitable form of interaction.

As an example of interaction 30, there may be an apparent cause and effect, where the presence of the first item 10 has an effect on the second item 20 and/or the presence of the second item 20 has an effect on the first item 10. The effect or effects may or may not be dependent upon one or more of: relative size, relative position, relative orientation, between the first item 10 and second item 20. As a further example of cause and effect, the first item 10 and the second item 20 may be combined to create a new displayable third item which may or may not have similarities to the first item 10 and/or the second item 20.

As an example of interaction 30, there may be a change in the relationship between the first item 10 and the second item 20. For example, one or more of the relative size, relative position, relative orientation, between the first item 10 and second item 20, may be changed. As another example, the first item 10 may be made to overlap the second item 20 and/or the second item 20 may be made to overlap the first item 10.

The user apparatus 100 enables continuous remote, real-time user-control of the interaction 30, in the display 230 of the remote display apparatus 200, between the second item 20 and the transferred first item 10. The user apparatus 100 continues to detect 320 user input, and in response sends the user input commands 40 via the wireless communication link to the remote display apparatus 200, which continues to control the interaction 30 in response to the received user input commands 40.

In this example, but not necessarily all examples, the control of interaction 30 initially comprises a scaling of the first item 10 relative to the second item 20.

Then the control of interaction 30 comprises a re-positioning of the first item 10 relative to the second item 20 so that the first item overlaps the second item 20.

Interaction data 22 that represents the current interaction 30, in the display 230 of the remote display apparatus 200, between the displayed second item 20 and the transferred first item 10 may be downloaded 424 from the display apparatus 200 to the user apparatus 100. The interaction data 22 enables recreation of the interaction 30 between the first item 10 and the second item 20 on a different display, for the example a display of the user apparatus 100 or a display of another apparatus.

The download 304 may be initiated at the user apparatus 100 or may occur automatically.

The display apparatus 200 may automatically remove 426 the first item 10 from the display 230 when at least one predetermined condition is satisfied.

The at least one predetermined condition may, for example, be one or more of:
a) termination of the wireless communications link between the display apparatus 200 and the user apparatus 100;
b) degradation of the wireless communications link between the display apparatus 200 and the user apparatus 100 below a threshold value (for example, as measured using received signal strength or bit error rate);
c) separation of the display apparatus 200 and the user apparatus 100 beyond a threshold distance or the occurrence of some other pre-defined spatial relationship between the user apparatus 100 and the display apparatus 200.

In some examples, but not necessarily all examples, if condition b) or condition c) is satisfied then the wireless communication link may be terminated.

In some examples, but not necessarily all examples, automatic download of interaction data 22 may occur before the wireless communication link is terminated.

The process can then be repeated using the same display apparatus 200 and the same user apparatus 100 or a different user apparatus 100.

FIGS. 8A, 8B, 8C and 8D illustrate examples of how the user apparatus 100 may be used by a user to control interaction 30, in the display 230 of the remote apparatus 200, between the displayed second item 20 and the transferred displayable first item 10 by controlling the size, position and/or orientation of the displayable first item 10.

In each of the FIGS. 8A-8D the display 230 is a rectangular planar display. The planar display 230 occupies an x-y plane defined by the orthogonal axes x and y. The x axis is parallel to a lower edge and upper edge of the display 230 and the y axis is parallel to side edges of the display 230. The user apparatus 100 is positioned at a distance d along a z axis from the display apparatus 200. The z axis is orthogonal to the x axis and the y axis ($z=x\hat{}y$).

Figure 8A:
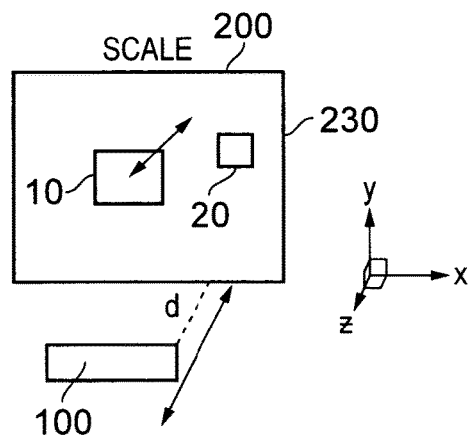
FIGS. 8A, 8B, 8C and 8D illustrate examples of how the user apparatus may be used by a user to control interaction, in the display of the remote apparatus, between the displayed second item and the transferred displayable first item by controlling the size, position and/or orientation of the displayable first item.

Referring to FIG. 8A, the user apparatus 100 generates first user input commands 40 in response to changes in a position of the user apparatus 100. In this example, the first user input commands 40 indicate the current distance d along the z-axis. The display apparatus 200 receives the first user input commands 40 and scales the displayable first item 10 relative to the displayed second item 20, in dependence upon the received first user input commands 40. In some examples, but not necessarily all examples, as the user apparatus 100 approaches the display apparatus 200 the first item may increase in size and as the user apparatus 100 moves away from the display apparatus 200 the first item may decrease in size. In other examples, but not necessarily all examples, as the user apparatus 100 approaches the display apparatus 200 the first item may increase in size and as the user apparatus 100 moves away from the display apparatus 200 the first item may decrease in size. Movement of the user apparatus 100 thus controls, in real-time, a size of the displayable first item 10 relative to a size of the displayed second item 20 in the display 230

Figure 8B:
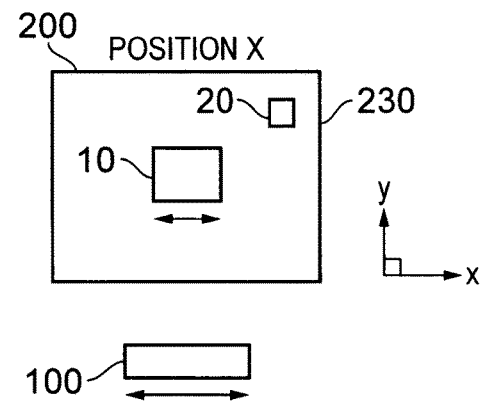

Referring to FIG. 8B, the user apparatus 100 generates first user input commands 40 in response to changes in a position of the user apparatus 100. In this example, the first user input commands 40 indicate the current distance X along the x-axis. The display apparatus 200 receives the first user input commands 40 and moves the displayable first item 10 relative to the displayed second item 20, in dependence upon the received first user input commands 40. In some examples, but not necessarily all examples, as the user apparatus 100 moves to the right relative to the display apparatus 200 the first item 10 moves right in the display 230 and as the user apparatus 100 moves left the first item moves left. Movement of the user apparatus 100 thus controls, in real-time, a location of the displayable first item 10 relative to a location of the displayed second item 20 in the display 230

Figure 8C:
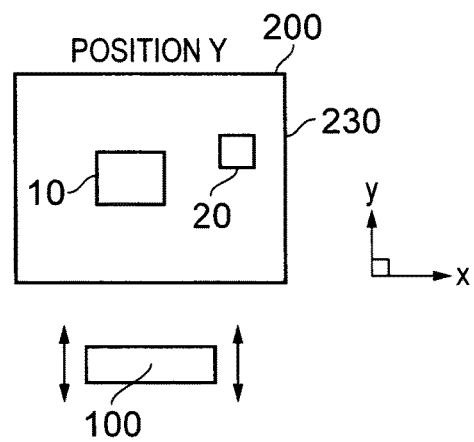

Referring to FIG. 8C, the user apparatus 100 generates first user input commands 40 in response to changes in a position of the user apparatus 100. In this example, the first user input commands 40 indicate the current distance Y along the y-axis. The display apparatus 200 receives the first user input commands 40 and moves the displayable first item 10 relative to the displayed second item 20, in dependence upon the received first user input commands 40. In some examples, but not necessarily all examples, as the user apparatus 100 moves up relative to the display apparatus 200 the first item 10 moves up in the display 230 and as the user apparatus 100 moves down the first item moves down. Movement of the user apparatus 100 thus controls, in real-time, a location of the displayable first item 10 relative to a location of the displayed second item 20 in the display 230

Figure 8D:
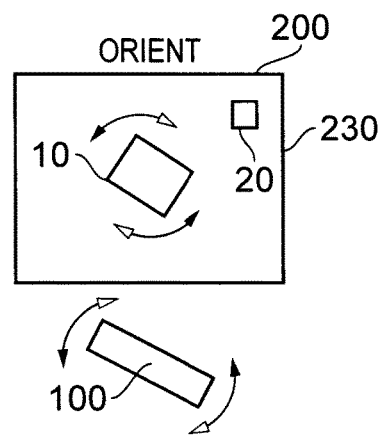

Referring to FIG. 8D, the user apparatus 100 generates second user input commands 40 in response to changes in an orientation of the user apparatus 100. A change in orientation may be a clockwise or counter-clockwise rotation about the z-axis (roll), a clockwise or counter-clockwise rotation about the x-axis (pitch), a clockwise or counter-clockwise rotation about the y-axis (yaw).

In this example, the second user input commands 40 indicate the roll of the user apparatus 100 but in other examples it may additionally or alternatively indicate yaw and/or pitch. The display apparatus 200 receives the first user input commands 40 and moves the displayable first item 10 relative to the displayed second item 20, in dependence upon the received second user input commands 40.

If the user apparatus 100 rolls, then the first item 10 may roll in the display 230 in real-time by an equivalent amount.

If the user apparatus 100 pitches, then the first item 10 may pitch in the display 230 in real-time by an equivalent amount.

If the user apparatus 100 yaws, then the first item 10 may yaw in the display 230 in real-time by an equivalent amount.

Orientation of the user apparatus 100 thus controls, in real-time, an orientation of the displayable first item 10 in the display 230.

In some examples, but not necessarily all examples, the user apparatus 100 is configured to enable one, some or all of the controls described with reference to FIGS. 8A to 8D.

FIG. 2A illustrates a controller 110 for a user apparatus 100. In some examples, but not necessarily all examples, the controller 110 may be a module such as a chip or chipset.

In some examples, but not necessarily all examples, the controller 110 comprises a processor 102 and a memory 104. The processor 102 is configured to read from and write to the memory 104.

The memory 104 stores a computer program 106 comprising computer program instructions (computer program code) that controls the operation of the user apparatus 100 when loaded into the processor 102. The computer program instructions, of the computer program 106, provide the logic and routines that enables the user apparatus 100 to perform one or more of the methods 300, examples of which are illustrated in FIGS. 1 and 7. The processor 102 by reading the memory 104 is able to load and execute the computer program 106.

The controller 110 may therefore comprise: at least one processor 102; and at least one memory 104 including computer program code 106 the at least one memory 104 and the computer program code 106 configured to, with the at least one processor 102, cause the user apparatus 100 at least to perform one or more of the methods 300.

For example, the at least one memory 104 and the computer program code 106 may be configured to, with the at least one processor 102, cause the user apparatus 100 at least to perform: causing transfer of a displayable first item 10 to a display 230 of a remote display apparatus 200 by causing transfer of data 12 to the remote display apparatus 200, the data 12 defining features of the displayable first item 10; and enabling remote user-control of interaction 30, in the display 230 of the remote display apparatus 200, between a second item 20 displayed in the display 230 of the remote display apparatus 200 and the transferred displayable first item 10.

As illustrated in FIG. 2B the computer program 106 may arrive at the user apparatus 100 via any suitable delivery mechanism 112. The delivery mechanism 112 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 106. The delivery mechanism may be a signal or data structure configured to reliably transfer the computer program 106. The user apparatus 100 may propagate or transmit the computer program 106 as a computer data signal.

The computer program code 106, when run on a computer, performs: enabling transfer of a displayable first item 10 to a display 230 of a remote display apparatus 200 by enabling transfer of data 12 to the remote display apparatus 200, the data 12 defining features of the displayable first item 10; and enabling remote user-control of interaction 30, in the display 230 of the remote display apparatus 200, between a second item 20 displayed in the display 230 of the remote display apparatus 200 and the transferred displayable first item 10.

FIG. 3 illustrates an example of a user apparatus 100 configured to perform one or more of the methods 300, such as for example the method 300 or the method 300'. The user apparatus 100 comprises a controller 110, a storage memory 120, a display 130, user input 150 and a radio transceiver 140.

The controller 110 may be a controller as described in relation to FIG. 2, alternatively it may be a different controller. For example, it may be a hardware controller such as an application specific integrated circuit (ASIC) or it may be a general purpose central processing unit of the user apparatus 100.

The controller 110 is configured to write to and read from the storage memory 120. The data 12, the interaction data 22 and/or the computer program code 106 may be stored in the storage memory 120 and accessed by the controller 110.

The controller 110 is configured to provide display commands to the display 130.

The controller 110 may, for example, be configured to use the data 12 to control the display 130 to display the first item 10 before it is transferred to the display apparatus 200.

The controller 110 may, for example, be configured to use the interaction data 22 to control the display 130 to display the interaction 30 between the first item 10 and the second item 20.

The controller 110 is configured to provide data for transmission along the wireless link to the radio transceiver 140. The controller 110 is configured to receive from the radio transceiver 140 data received along the wireless link by the radio transceiver 140.

In this example, but not necessarily all examples, the wireless communication is radio frequency communication. It may use near field communication or far field communication. It may use a multiple access communication protocol. It may be a terminal using a mobile cellular communications protocol.

The controller 110 is configured to receive user input commands 40 from the user input 150. In some examples, but not necessarily all examples, the user input comprises one or more sensors 55 for sensing spatial relationship(s).

The sensors 55 may include one or more of: a magnetometer 51, a gyroscope 52, one or more accelerometers 53, one or more distance sensors 54. The sensors 55 are configured to generate user input commands in response to movement (position and/or orientation) of the user apparatus 100. These sensors may enable the user apparatus 100 to detect changes in its x, y and z position and also detect roll, yaw and pitch.

The controller 110 is configured to cause transfer of a displayable first item 10 to a display 230 of a remote display apparatus 200 by causing transfer of data 12 to the remote display apparatus 200, the data 12 defining features of the displayable first item 10; and enable remote user-control of interaction 30, in the display 230 of the remote display apparatus 200, between a second item 20 displayed in the display 230 of the remote display apparatus 200 and the transferred displayable first item 10.

FIG. 4A illustrates a controller 210 for a display apparatus 200. In some examples, but not necessarily all examples, the controller 210 may be a module such as a chip or chipset.

In some examples, but not necessarily all examples, the controller 210 comprises a processor 202 and a memory 204. The processor 202 is configured to read from and write to the memory 204.

The memory 204 stores a computer program 206 comprising computer program instructions (computer program code) that controls the operation of the display apparatus 200 when loaded into the processor 202. The computer program instructions, of the computer program 206, provide the logic and routines that enables the display apparatus 200 to perform one or more of the methods 400, examples of which are illustrated in FIGS. 1 and 7. The processor 202 by reading the memory 204 is able to load and execute the computer program 206.

The controller 210 comprises: at least one processor 202; and at least one memory 204 including computer program code 206 the at least one memory 204 and the computer program code 206 configured to, with the at least one processor 202, cause the user apparatus 200 at least to perform one or more of the methods 400.

For example, the at least one memory 404 and the computer program code 406 may be configured to, with the at least one processor 402, cause the display apparatus 200 at least to perform:

enabling transfer of a displayable first item 10 to a display 230 of the display apparatus 200 by enabling transfer of data 12 from a remote user apparatus 100, the data 12 defining features of the displayable first item 10;

causing display of the displayable first item 10 in the display 230 using the data 12 received from the remote user apparatus 100;

causing display of a displayable second item 20 in the display 230; and controlling interaction 30, in the display 230, between the displayable first item 10 and the displayable second item 20 in response to user input commands 40 received from the remote user apparatus 100.

As illustrated in FIG. 4B the computer program 206 may arrive at the display apparatus 200 via any suitable delivery mechanism 212. The delivery mechanism 212 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 206. The delivery mechanism may be a signal or data structure configured to reliably transfer the computer program 206. The display apparatus 200 may propagate or transmit the computer program 206 as a computer data signal.

The computer program code 206, when run on a computer, performs:

enabling transfer of a displayable first item 10 to a display 230 of the display apparatus 200 by enabling transfer of data 12 from a remote user apparatus 100, the data 12 defining features of the displayable first item 10;

causing display of the displayable first item 10 in the display 230 using the data 12 received from the remote user apparatus 100;

causing display of a displayable second item 20 in the display 230; and controlling interaction 30, in the display 230, between the displayable first item 10 and the displayable second item 20 in response to user input commands 40 received from the remote user apparatus 100.

FIG. 5 illustrates an example of a display apparatus 200 configured to perform one or more of the methods 400, such as for example the method 400 or method 400'. The display apparatus 200 comprises a controller 210, a storage memory 220, the display 230, and a radio transceiver 240.

The controller 210 may be a controller 210 as described in relation to FIG. 4A, alternatively it may be a different controller. For example, it may be a hardware controller such as an application specific integrated circuit (ASIC) or it may be a general purpose central processing unit of the display apparatus 200.

The controller 210 is configured to write to and read from the storage memory 220. The data 12, after transfer, may be stored in the storage memory 220 and accessed by the controller 210. Data 22 defining the features of the second item 20 may be stored in the storage memory 220.

The controller 210 is configured to provide display commands to the display 230.

The controller 210 may, for example, be configured to control the display 230 to display the second item 20 before transfer of the first item 10 to the display apparatus 200.

The controller 110 may, for example, be configured to control the display 230 to display simultaneously the second item 20 and the first item 10.

The controller 110 is, for example, configured to control the display 230 to display interaction 30 between the second item 20 and the first item 10.

The controller 210 is configured to provide data (e.g. interaction data 22) for transmission along the wireless link to the radio transceiver 240. The controller 210 is configured to receive from the radio transceiver 240 data (e.g. data 12, user input commands 40) received along the wireless link from the radio transceiver 240.

In this example, but not necessarily all examples, the wireless communication is radio frequency communication. It may use near field communication or far field communication. It may use a multiple access communication protocol. It may be a terminal using a mobile cellular communications protocol.

The controller 210 is configured to receive user input commands 40, from the transceiver 240 that have been received from the user apparatus 100 and control the display 230 in response to those commands 40.

The controller 210 is configured to cause the display apparatus 200 at least to perform:

enabling transfer of a displayable first item 10 to a display 230 of the display apparatus 200 by receiving data 12 from a remote user apparatus, the data 12 defining features of the displayable first item 10;

enabling display of the displayable first item 10 in the display 230;

controlling interaction 30, in the display 230, between the displayable first item 10 and a displayable second item 20 in response to the user input commands 40 received from the remote user apparatus 100.

Figure 9:
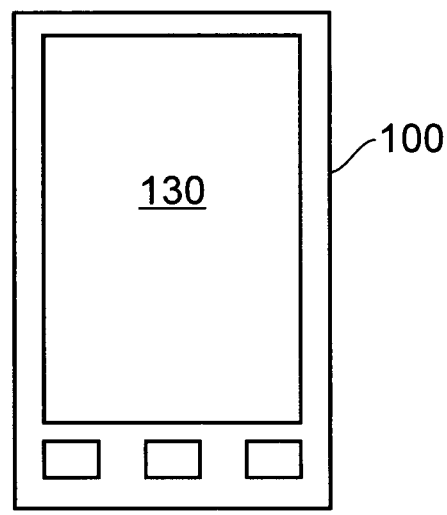
FIG. 9 illustrates an example of a user apparatus configured as a mobile apparatus.

FIG. 9 illustrates an example of a user apparatus. In this example, but not necessarily all examples, the user apparatus 100 is configured as a mobile apparatus, in this case, a hand-portable apparatus that is sized to be carried in a palm of the hand and fit into a shirt pocket.

The user apparatus 100 may be a mobile personal communications apparatus that uses one or more wireless communication protocols (e.g. Bluetooth®, WLAN, 3GPP, etc).

Figure 10:
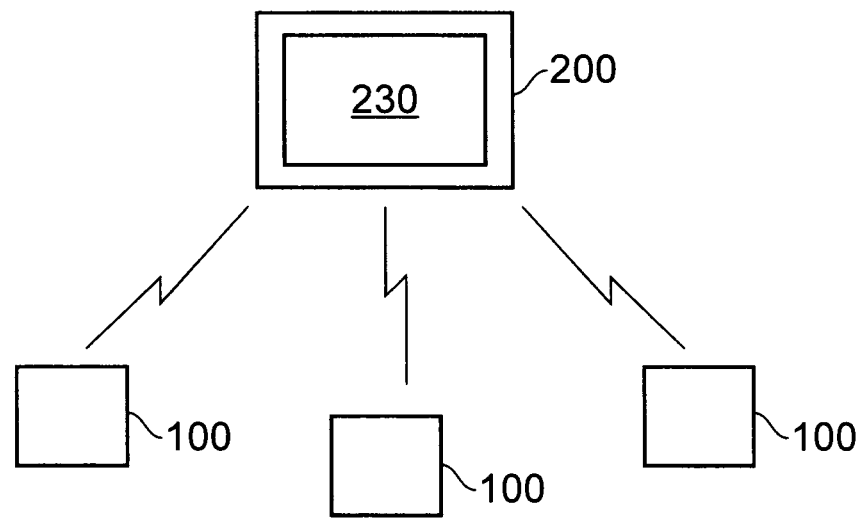
FIG. 10 illustrates an example in which the display apparatus is configured to operate simultaneously with multiple remote user apparatuses.

FIG. 10 illustrates an example in which the display apparatus 200 is configured to operate simultaneously with multiple remote user apparatus 100. The display 230 may be configured to be simultaneously viewed by the multiple remote users of the multiple remote user apparatus 100. In this example, but not necessarily all examples, the display 230 is configured as a large scale, public, screen suitable for outdoor events In the example of the methods 300, 400 illustrated in FIGS. 11A to 11D, but not necessarily all examples, the displayable first item 10 is a three-dimensional model of the user of the user apparatus 100 and the displayed second item 20 is clothing. Enabling remote user-control of interaction 30, in the display 230 of the remote display apparatus 200, between the displayed second item 20 and the transferred displayable first item 10 comprises enabling fitting the three-dimensional model to the clothing.

Figure 11A:
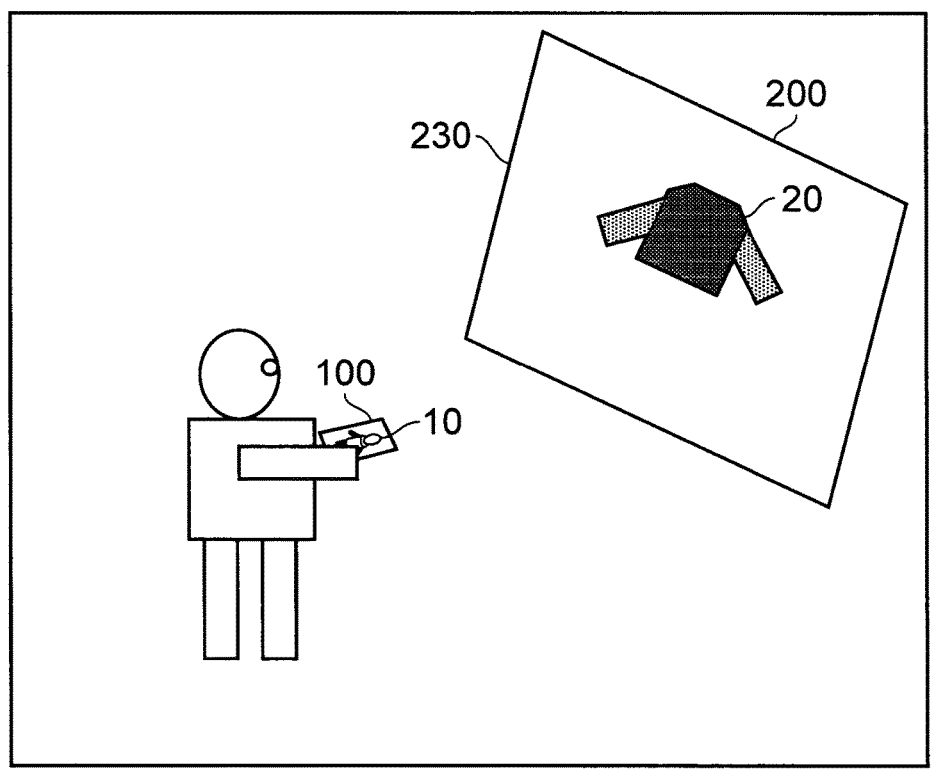
FIGS. 11A to 11D illustrates an example in which the displayable first item is a three-dimensional model of the user of the user apparatus and the displayed second item is clothing.

In FIG. 11A, a user has the first item 10 (a 3D model of himself or herself) saved on the user apparatus 100. The display 230 of the display apparatus 200 displays a second item 20 (clothing).

Figure 11B:
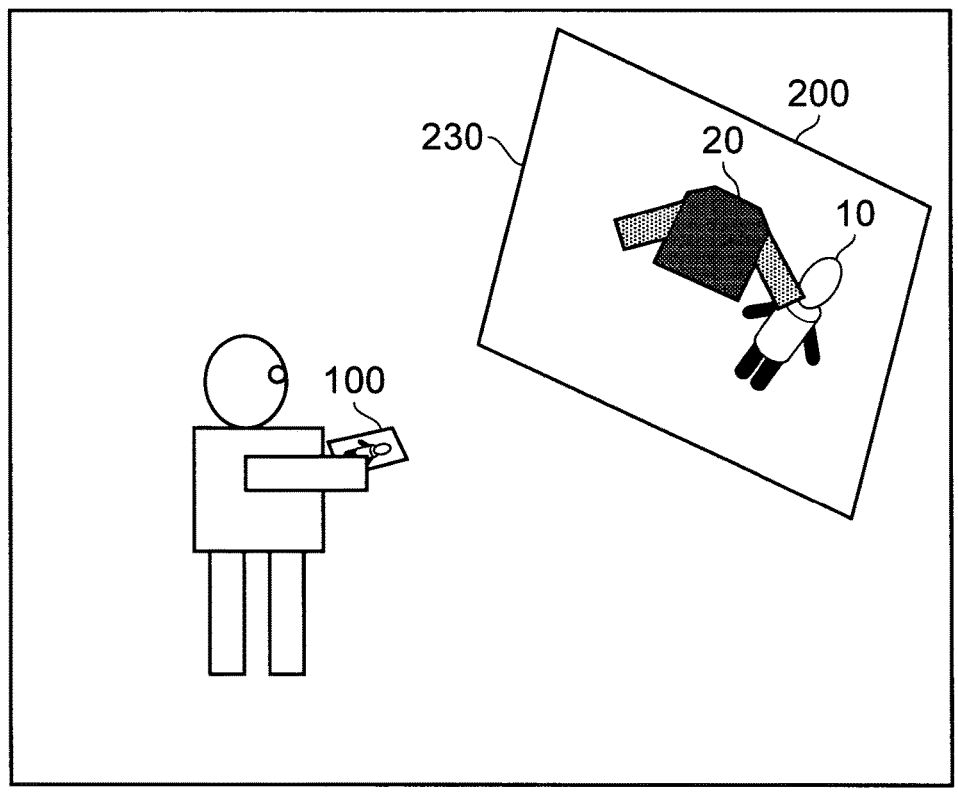

In FIG. 11B, the first item 10 (the 3D model) is transferred to the display 230 of the display apparatus 200. The display 230 displays the first item 10 (the 3D model of the user) and the second item 20 (the clothing).

Figure 11C:
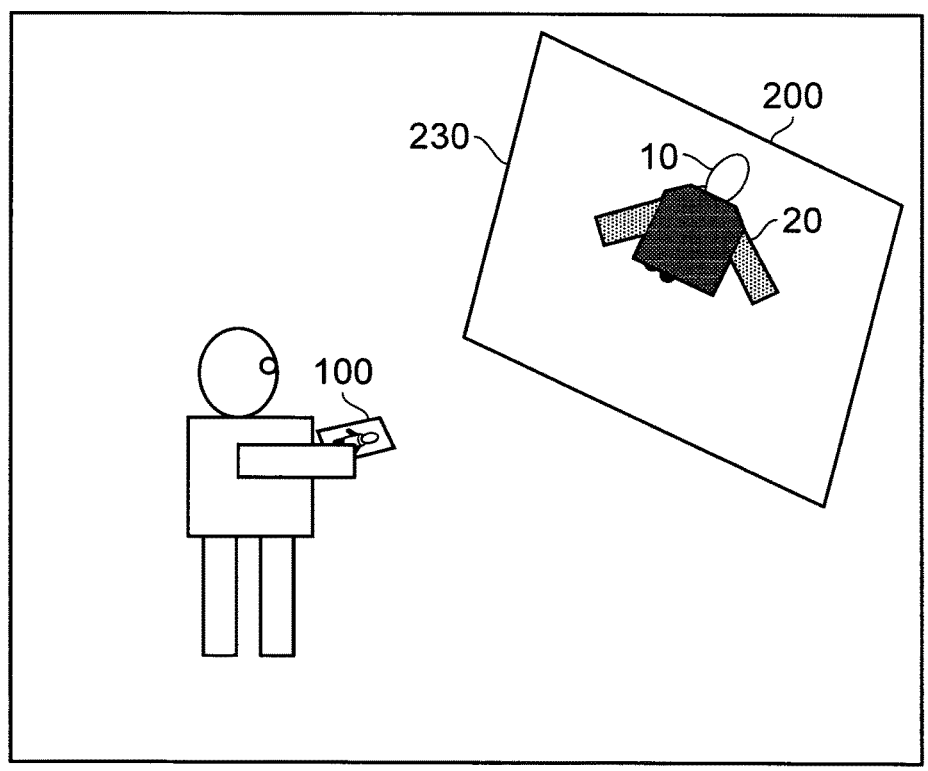

In FIG. 11C, the user of the user apparatus 100 moves and orientates the user apparatus 100 to position and orient the first item 10 relative to the second item 20 (so that the 3D model wears the clothing).

Figure 11D:
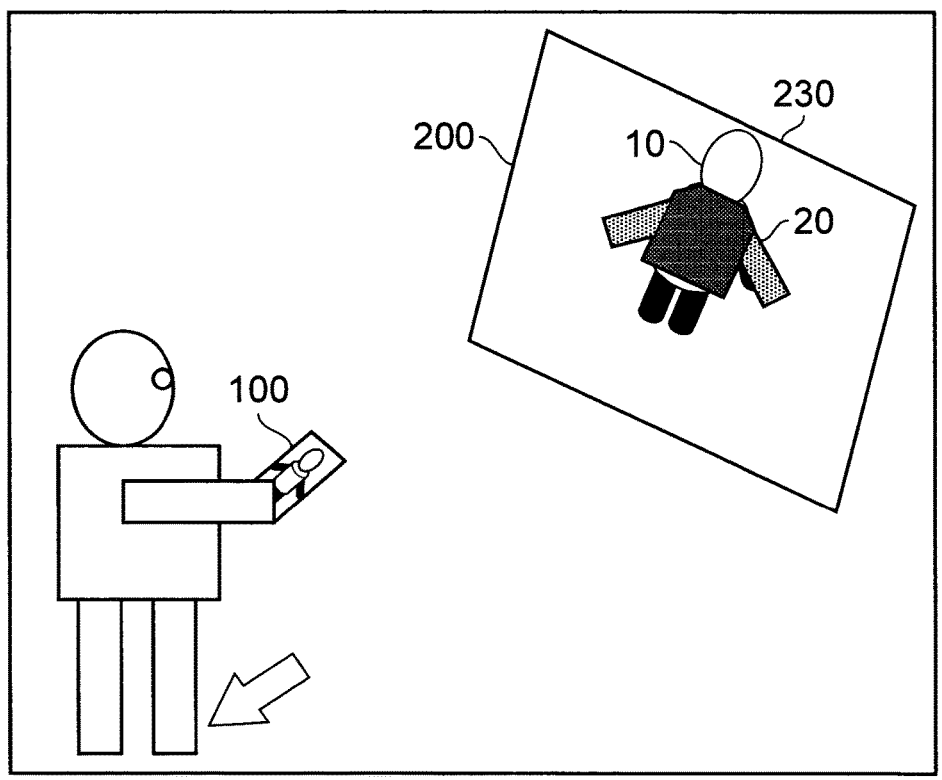

In FIG. 11D, the user of the user apparatus 100 moves away from the screen carrying his user apparatus 100 with him. The first item 10 is scaled (enlarged) relative to the second item 20 so that the 3D model fits the clothing.

Figure 12A:
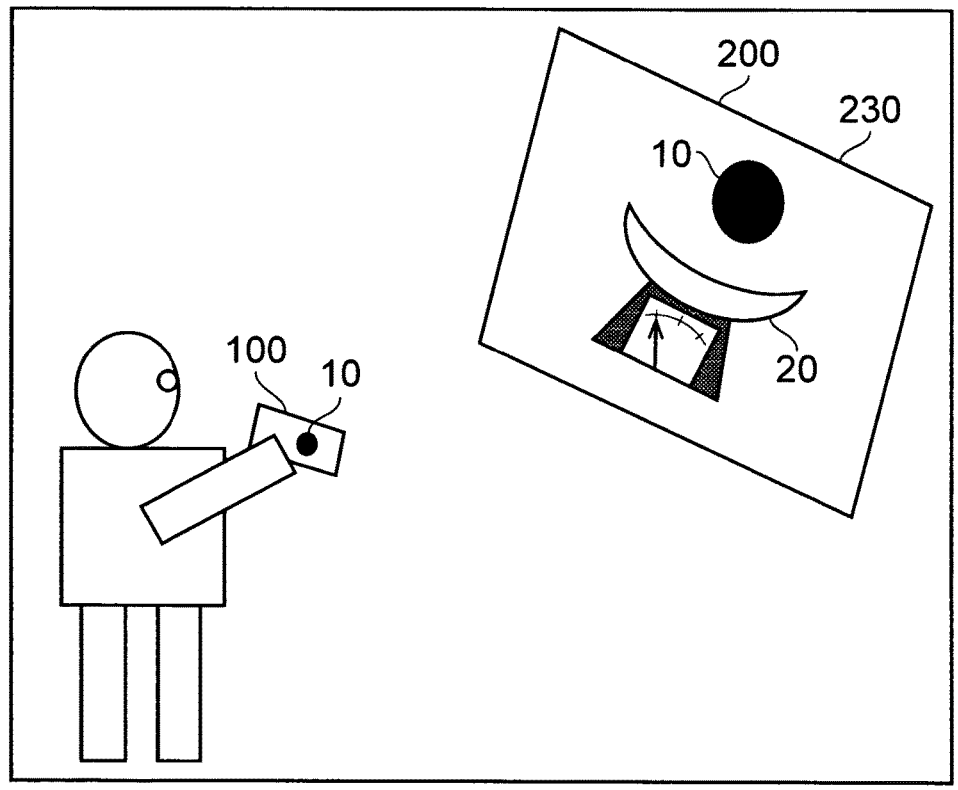
FIGS. 12A to 12C illustrate an example in which the displayable first item is an item to be weighed and the displayed second item is a weighing scale.
Figure 12B:
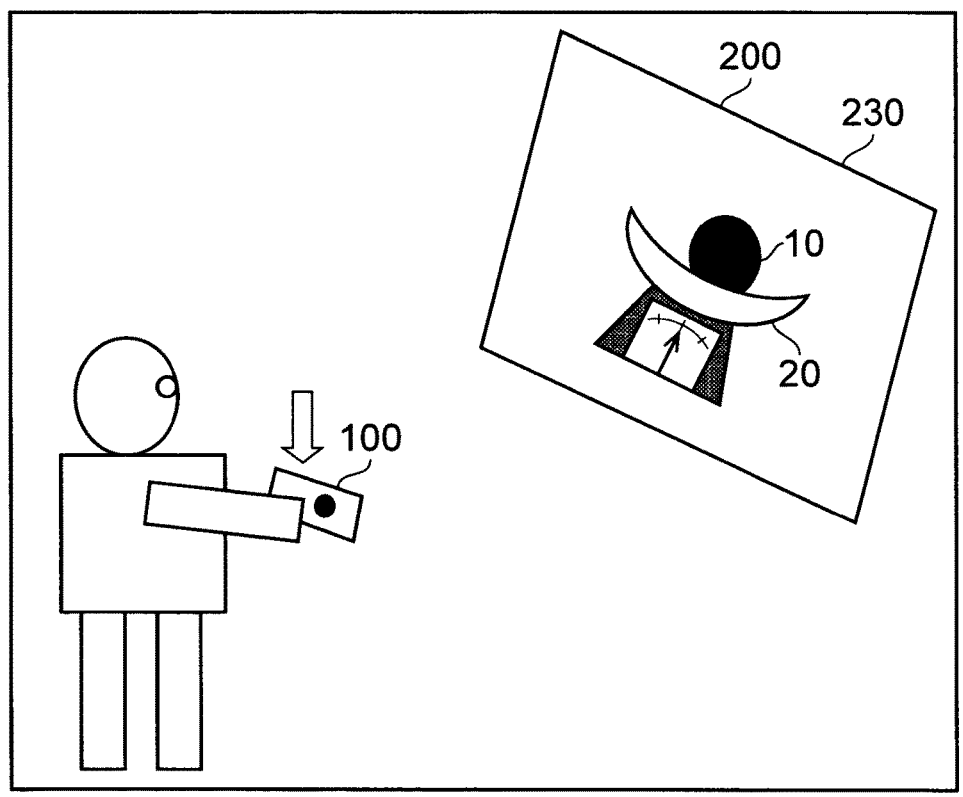
Figure 12C:
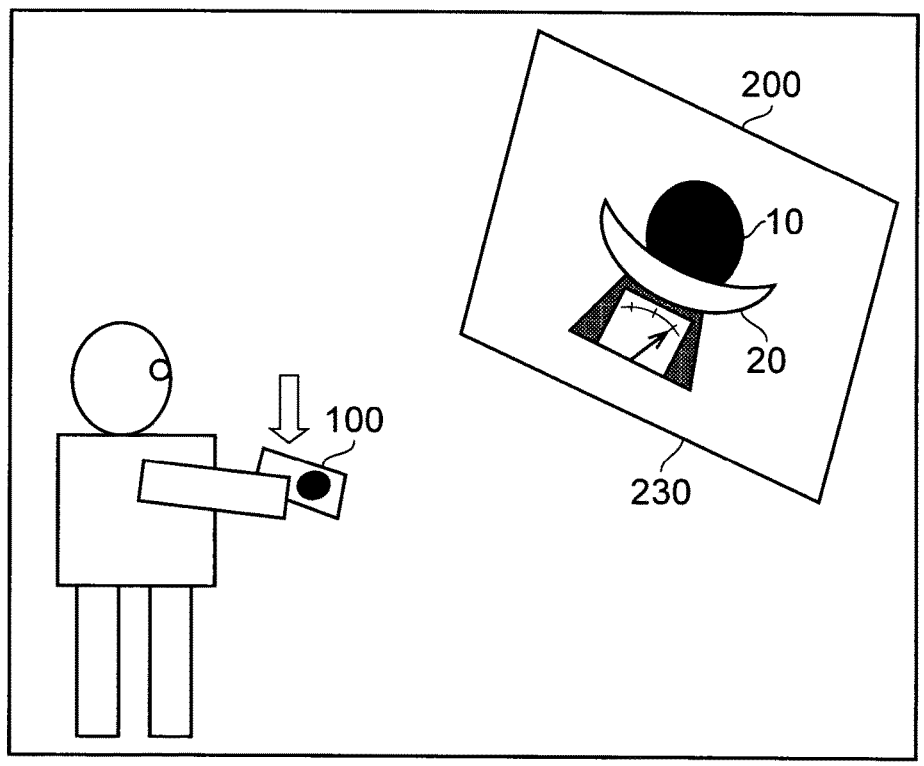

In the example of the methods 300, 400 illustrated in FIGS. 12A to 12C, but not necessarily all examples, the displayable first item 10 is an item to be weighed and the displayed second item 20 is a weighing scale. Enabling remote user-control of interaction, in the display 230 of the remote display apparatus 200, between the displayed second item 20 and the transferred displayable first item 10 comprises placing the item 10 on the weighing scale 20 so that it is weighed by the weighing scale 20.

In FIG. 12A, a user has the first item 10 (an object to be weighed) saved on the user apparatus 100 and transfers it to the display 230 of the display apparatus 200. The display 230 displays the first item 10 (the object to be weighed) and the second item 20 (weighing scales). In this example, the object is not on the weighing scales and the weighing scales indicates a zero mass.

In FIG. 12B the user of the user apparatus 100 moves the user apparatus 100 downwards. This results in movement of the first item 10 downwards onto the second item 20. The display 230 displays the first item 10 (the object to be weighed) on top of the second item 20 (weighing scales). In this example, the object is on the weighing scales and the weighing scales indicates a non-zero mass.

FIG. 12C is similar to FIG. 12B, except that the first item 10 (the object to be weighed) is larger (greater mass). In this example, the object is on the weighing scales and the weighing scales indicates a greater non-zero mass than in FIG. 12B.

Figure 13A:
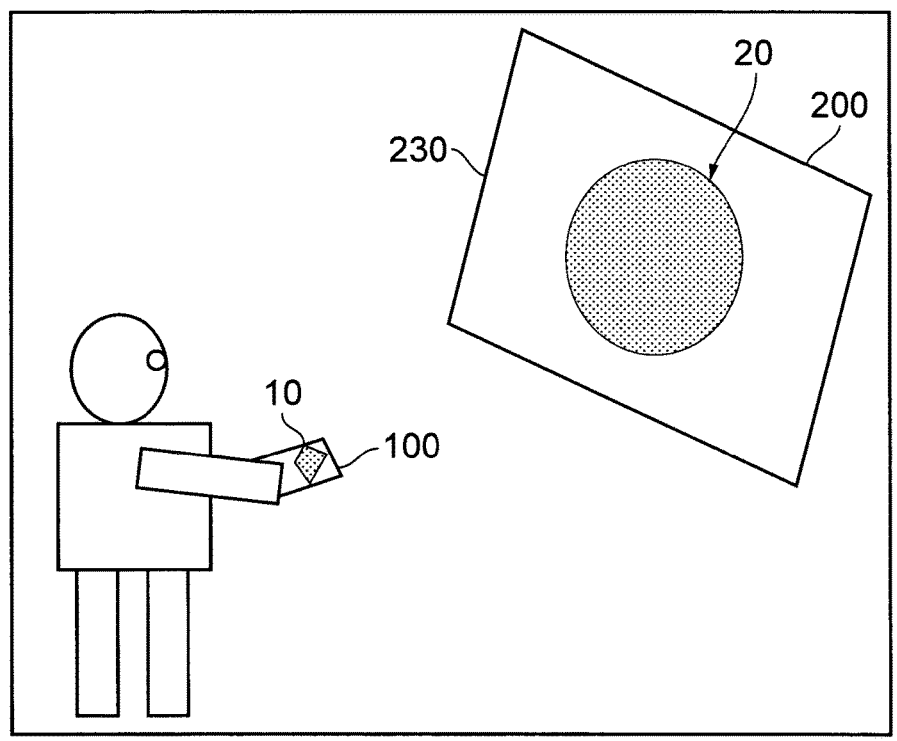
FIGS. 13A to 13B illustrate an example in which the displayable first item is an item to be cooked and the displayed second item is a cooking pan.
Figure 13B:
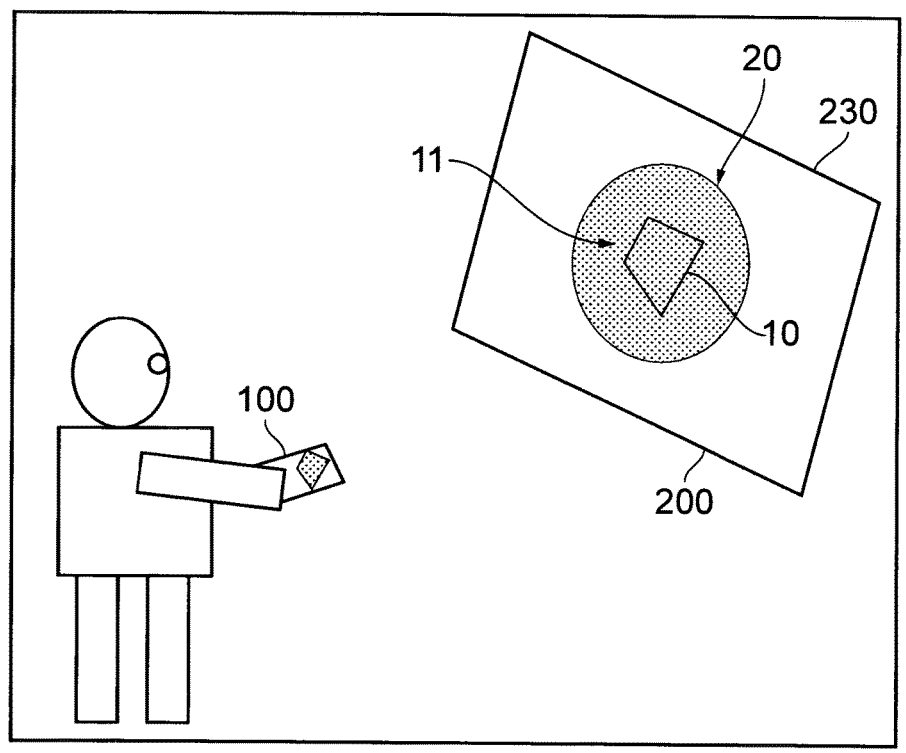

In the example of the methods 300, 400 illustrated in FIGS. 13A to 13B, but not necessarily all examples, the displayable first item 10 is an item to be cooked and the displayed second item 20 is a cooking pan. Enabling remote user-control of interaction, in the display 230 of the remote display apparatus 200, between the displayed second item 20 and the transferred displayable first item 10 comprises: enabling placement of the first item 10 in the cooking pan 20 so that the item appears to cook.

In FIG. 13A, a user has the first item 10 (a item to be cooked) saved on the user apparatus 100. The display 230 of the display apparatus 200 displays a second item 20 (a cooking pan).

The first item 10 (the item to be cooked) is transferred to the display 230 of the display apparatus 200. The display 230 displays the first item 10 (the item to be cooked) and the second item 20 (the cooking pan).

In FIG. 13B, the first item 10 (the item to be cooked) appears to be cooking. Smoke/steam 11 is rising from the first item 10.

In FIGS. 3 and 5, the components of the user apparatus 100 and the display apparatus 200 may be operationally coupled to the respective processor 102 or 202 and any number or combination of intervening elements can exist (including no intervening elements)

Implementation of a controller 110, 210 can be in hardware alone (a circuit, a processor . . . ), have certain aspects in software including firmware alone or can be a combination of hardware and software (including firmware).

The controller 110, 210 may be implemented using instructions that enable hardware functionality, for example, by using executable computer program instructions in a general-purpose or special-purpose processor that may be stored on a computer readable storage medium (disk, memory etc) to be executed by such a processor.

Although the memories 104, 120 are illustrated as a single components they may be implemented as one or more separate components some or all of which may be integrated/removable and/or may provide permanent/semi-permanent/dynamic/cached storage.

Although the processor 102 is illustrated as a single component it may be implemented as one or more separate components some or all of which may be integrated/removable.

Although the memories 204, 220 are illustrated as a single components they may be implemented as one or more separate components some or all of which may be integrated/removable and/or may provide permanent/semi-permanent/dynamic/cached storage.

Although the processor 202 is illustrated as a single component it may be implemented as one or more separate components some or all of which may be integrated/removable.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device."

As used here 'module' refers to a unit or apparatus that excludes certain parts/components that would be added by an end manufacturer or a user.

The blocks illustrated in the FIGS. 1 and 7 may represent steps in a method and/or sections of code in the computer program 106, 206. The illustration of a particular order to the blocks does not necessarily imply that there is a required or preferred order for the blocks and the order and arrangement of the block may be varied. Furthermore, it may be possible for some blocks to be omitted.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. An apparatus comprising:
    at least one processor; and
    at least one memory including computer program code,
        the at least one memory and the computer program code configured to, with the at least one processor, cause the apparatus at least to perform:
    causing transfer of a displayable first item to a display of a remote apparatus by causing transfer of data to the remote apparatus, the data defining features of the displayable first item;
    enabling remote user-control of interaction, in the display of the remote apparatus, between a second item displayed in the display of the remote apparatus and the transferred displayable first item; and
    in response to a first user input command, controlling of interaction, in the display of the remote apparatus, between the displayed second item and the transferred displayable first item by scaling a size of the displayable first item relative to the displayed second item, wherein the first item and the second item each comprise a graphical item unrelated to a user input function.

2. An apparatus as claimed in claim 1 wherein the at least one memory and the computer program code are further configured to, with the at least one processor, cause the apparatus at least to perform:
    detecting user input commands; and
    enabling, in response to the detected user input commands, wireless communication with the remote apparatus to provide remote user-control of interaction, in the display of the remote apparatus, between the displayed second item and the transferred displayable first item.

3. An apparatus as claimed in claim 2, further comprising one or more sensors configured to generate user input commands in response to movement of the apparatus.

4. An apparatus as claimed in claim 3, wherein the one or more of the sensors are configured to generate first user input command in response to a change in a position of the apparatus.

5. An apparatus as claimed in claim 1, wherein enabling remote user-control of interaction, in the display of the remote apparatus, between a displayed second item and the transferred displayable first item comprises:

controlling overlap of the displayed second item and the displayable first item defined by the transferred data.

6. An apparatus as claimed in claim 1, wherein enabling remote user-control of interaction, in the display of the remote apparatus, between a displayed second item and the transferred displayable first item comprises:

controlling creation of a new displayable third item by combining the displayed second item and the transferred displayable first item.

7. An apparatus as claimed in claim 1, wherein the at least one memory and the computer program code are further configured to, with the at least one processor, cause the apparatus at least to perform:

causing display of the displayable first item at the apparatus before causing transfer of the displayable first item to the display of the remote apparatus.

8. An apparatus as claimed in claim 1, wherein the displayable first item is a three-dimensional model of a user and the displayed second item is clothing and wherein the at least one memory and the computer program code are configured to, with the at least one processor, cause the apparatus to display a graphical representation of a fitting interaction wherein the three-dimensional model is fitted to the clothing on the display.

9. An apparatus as claimed in claim 1, wherein the displayed second item is a weighing scale and wherein the at least one memory and the computer program code are configured to, with the at least one processor, cause the apparatus to display a graphical representation of a weighing interaction wherein the displayable first item is weighed by the weighing scale on the display.

10. An apparatus as claimed in claim 1, wherein the displayable first item is an item and the displayed second item is a cooking pan and wherein the at least one memory and the computer program code are configured to, with the at least one processor, cause the apparatus to display a graphical representation of a cooking interaction wherein the displayable first item appears to cook in the cooking pan on the display.

11. An apparatus comprising: at least one processor; and at least one memory including computer program code the at least one memory and the computer program code configured to, with the at least one processor, cause the apparatus at least to perform:

enabling transfer of a displayable first item to a display of the apparatus by enabling transfer of data from a remote user apparatus, the data defining features of the displayable first item;

causing display of the displayable first item in the display using the data received from the remote user apparatus;

causing display of a displayable second item in the display;

controlling interaction, in the display, between the displayable first item and the displayable second item in response to user input commands received from the remote user apparatus; and in response to a first user input command, controlling of interaction, in the display of the remote apparatus, between the displayed second item and the transferred displayable first item by scaling a size of the displayable first item relative to the displayed second item, wherein the first item and the second item each comprise a graphical item unrelated to a user input function.

12. An apparatus as claimed in claim 11 wherein the at least one memory and the computer program code are configured to, with the at least one processor, cause the apparatus at least to perform: detecting first user input commands recording changes in a position of the remote user apparatus.

13. An apparatus as claimed in claim 11, wherein the displayable first item is a three-dimensional model of the user and the displayed second item is clothing and wherein the at least one memory and the computer program code are configured to, with the at least one processor, cause the apparatus to display a graphical representation of a fitting interaction wherein the three-dimensional model is fitted to the clothing on the display.

14. An apparatus as claimed in claim 11, wherein the displayable first item is an item and the displayed second item is a weighing scale and wherein the at least one memory and the computer program code are configured to, with the at least one processor, cause the apparatus to display a graphical representation of a weighing interaction wherein the item on the weighing scale is weighed by the weighing scale on the display.

15. An apparatus as claimed in claim 11, wherein the displayable first item is an item and the displayed second item is a cooking pan and wherein the at least one memory and the computer program code are configured to, with the at least one processor, cause the apparatus to display a graphical representation of a cooking interaction wherein the item appears to cook in the cooking pan on the display.

16. A method comprising:

enabling transfer of a displayable first item to a display of an apparatus by receiving data from a remote user apparatus, the data defining features of the displayable first item;

displaying a displayable second item in the display;

displaying the displayable first item in the display;

receiving user input commands from the remote user apparatus;

controlling interaction, in the display, between the displayable first item and the displayable second item in response to the received user input commands; and in response to a first user input command, controlling of interaction, in the display of the remote apparatus, between the displayed second item and the transferred displayable first item by scaling a size of the displayable first item relative to the displayed second item, wherein the first item and the second item each comprise a graphical item unrelated to a user input function.

* * * * *